United States Patent
Bliss

[11] Patent Number: 5,902,071
[45] Date of Patent: May 11, 1999

[54] PLASTIC PERMEABLE GROYNE SYSTEM

[76] Inventor: Edwin C. Bliss, 24940 SW 129 Ct., Miami, Fla. 33032

[21] Appl. No.: 08/893,112
[22] Filed: Jul. 15, 1997
[51] Int. Cl.$^6$ .............................. E02B 3/06; B22D 19/04
[52] U.S. Cl. ................................ 405/21; 249/95; 405/15; 405/34
[58] Field of Search .................... 405/32–35, 21; 249/90–97, 171, 143, 43

[56] References Cited

U.S. PATENT DOCUMENTS

| | | | |
|---|---|---|---|
| 247,065 | 9/1881 | Knapp | 405/34 |
| 867,802 | 10/1907 | Cottrell | 405/34 X |
| 1,812,300 | 6/1931 | Leeds et al. | 405/33 |
| 2,750,790 | 6/1956 | Peper | 249/95 |
| 3,280,569 | 10/1966 | Wosenitz | 405/34 |
| 3,344,609 | 10/1967 | Greiser . | |
| 3,779,021 | 12/1973 | Green | 249/90 X |
| 4,417,842 | 11/1983 | Landry, Jr. | 414/572 |
| 5,069,579 | 12/1991 | Burns | 405/25 |
| 5,551,662 | 9/1996 | Keady | 249/143 X |
| 5,556,230 | 9/1996 | Turk et al. | 405/29 |

Primary Examiner—Dennis L. Taylor
Attorney, Agent, or Firm—Patent & Trademark Services; Joseph H. McGlynn

[57] ABSTRACT

A system of plastic pipes which are anchored vertically in place along a shoreline by a concrete form that will position the pipes with a specific distance between pipes. Once the pipes are positioned, a concrete cap will be poured to permanently secure the pipes, after which the concrete form can be removed and moved to a new location.

6 Claims, 1 Drawing Sheet

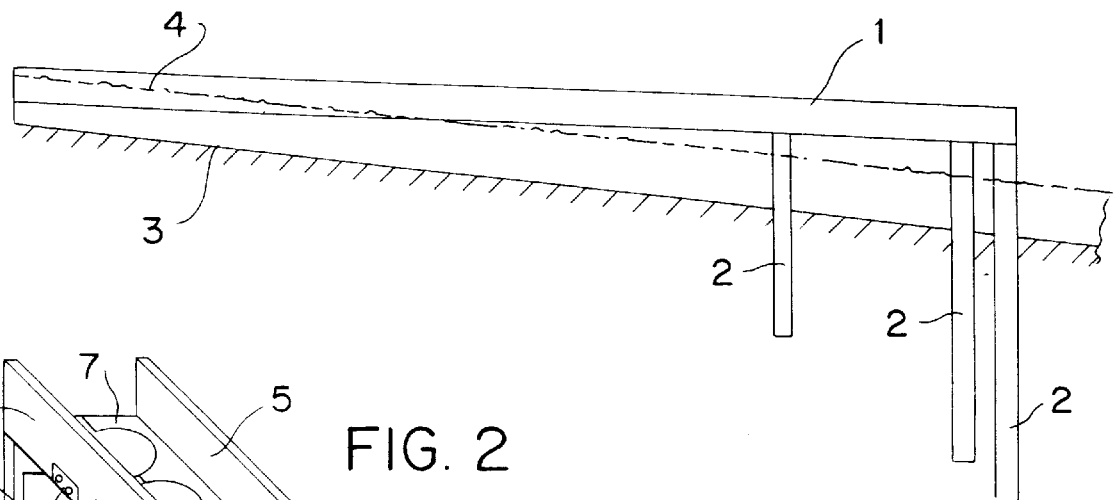
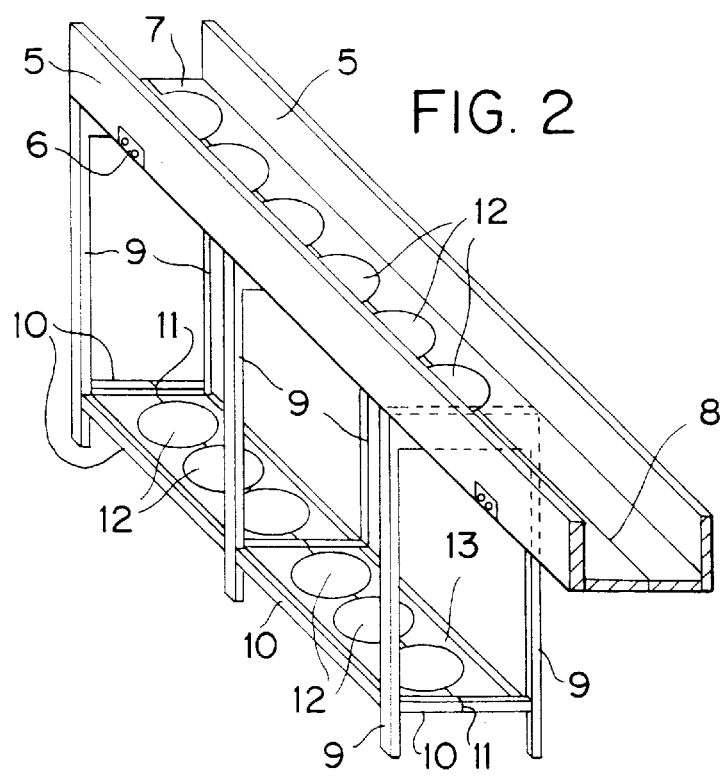
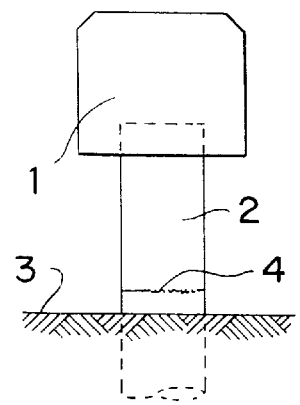
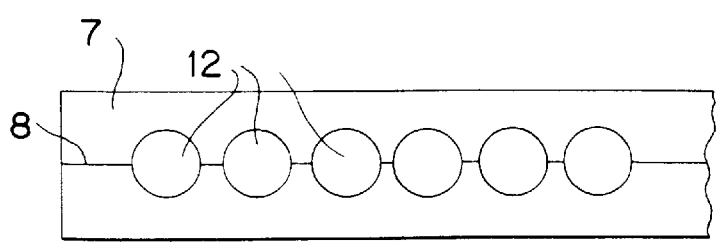
FIG. 1
FIG. 2
FIG. 4
FIG. 3

PLASTIC PERMEABLE GROYNE SYSTEM

BACKGROUND OF THE INVENTION

This invention relates, in general, to permeable groynes, and, in particular, to permeable groynes which absorb wave energy and deposit sand uniformly on both sides of the groyne.

DESCRIPTION OF THE PRIOR ART

In the prior art various types of protective groynes. For example, U.S. Pat. No. 3,344,609 discloses a layer of thin, flexible foraminius sheet material which is pervious to water but not pervious to the substance of the littoral formation. The material is laid onto the littoral formation and has means for preventing the entrance of water beneath edge portions of the layer.

U.S. Pat. No. 4,417,842 discloses an apparatus for aligning and loading inserts for soil erosion prevention blocks. The apparatus has a rollable main frame with an insert holder. Secured within the insert holder is an aligning frame which receives the inserts and aligns them in a desired manner.

U.S. Pat. No. 5,069,579 discloses an erosion prevention device comprising a concrete block which receives current reduction flaps on the top of the block. The reduction flaps reduce the wave action and, therefore, lessen their effect on the shore.

U.S. Pat. No. 5,556,230 discloses a cylindrical armor unit for use in a revetment structure, the units interlock along all major axes with a flexible interlocking structure so that they can be placed along shorelines with abrupt transitions.

While the prior art devices work in their intended manner, all of them are concerned with preventing the destructive action of wave energy upon the shore line. However, this is only one of the major problems associated with beach erosion. The other problem, which has not been recognized by the prior art is the depositing of sand uniformly on both side s of the protective system, which will not only protect the shore line, but also help to build up or reconstruct the shore line.

SUMMARY OF THE INVENTION

The present invention comprises a system of plastic pipes which are anchored vertically in place along a shoreline by a concrete form that will position the pipes with a specific distance between pipes. Once the pipes are positioned, a concrete cap will be poured to permanently secure the pipes, after which the concrete form can be removed and moved to a new location.

It is an object of the present invention to provide a new and improved groyne system to protect a shoreline from wave action.

It is an object of the present invention to provide a new and improved groyne system which will help to redistribute sand on both sides of the groyne system These and other objects and advantages of the present invention will be fully apparent from the following description, when taken in connection with the annexed drawings.

BRIEF DESCRIPTION OF THE DRAWINGS

FIG. 1 is a side view of the present invention when installed.

FIG. 2 is a perspective view of a form used to assemble the present invention.

FIG. 3 is a top view of the form used to assemble the present invention.

FIG. 4 is an end view showing the concrete cap and one of the pipes of the present invention.

DESCRIPTION OF THE PREFERRED EMBODIMENT

Referring now to the drawings in greater detail, FIG. 1 shows the present invention after it has been assembled on a shoreline. Hollow plastic pipes 2 have been mounted into the ground 3 which is subject to wind forces and wave action from water 4. Attached to the pipes 2 is a concrete cap 1 which has been formed using the concrete form shown in FIGS. 2–4. Also, it should be noted that the number of pipes 2 shown are merely for illustrational purposes, and more or fewer pipes can be used depending on the severity of the wind and wave action that will be experienced in a particular area. For example the form shown in FIG. 2 has eight apertures 12 for receiving the pipes 2 and the apertures are positioned in a straight line. Depending on the circumstances, more or less than eight pipes can be formed by adjusting the dimensions of the form. In addition, the apertures do not have to be positioned in a straight line, but rather other positions such as, but not limited to, a double row of staggered apertures may be used.

The form used to form the groyne, shown in FIG. 1, is shown in FIG. 2. The form comprises a frame composed of vertical legs 9 which are connected by any conventional method to horizontal cross pieces 10. The frame is made in two parts which meet at a joint line 11 which will allow the frame to be easily separated once the concrete is poured and allowed to set properly. The two halves of the frame can be secured by any conventional means such as nuts and bolts, not shown.

Attached to the top of the frame is a concrete form having a bottom 7 to which are attached sides 5 by hinges 6. The hinges allow the sides to be pivoted away from the concrete cap 1 after it has been poured and allowed to set. This will allow the form to be dissembled easier. In addition the floor 7 can be made in halves which meet at a joint line 8 to help in the dissembly of the form. The form halves can be secured by any conventional concrete form clamp, not shown, while the concrete is being poured.

Mounted adjacent to the bottom of the frame is a pipe holding assembly 13 which is similar to the form 7 except is does not have any sides. The assembly 13 will be used to help hold the pipes 2 while the concrete is being poured. The assembly 13 can also be made in halves similar to the frame and the top form.

In use, the form shown in FIG. 2 would be assembled in the desired location. Pipes 2 would be inserted into the apertures 12 in the floor 7 of the top form and into the apertures 12 in the pipe holding assembly 13. The pipes could be passed through the apertures after the frame and the concrete form is assembled, or they could be positioned before the halves of the frame are joined. As shown in FIG. 1, the length of the pipes 2 can be varied depending on the location where they will be installed. In addition, the apertures 12, as shown in FIG. 3 are prespaced so the pipes 2 will be separated from each other. This spacing will allow sand to accumulate between the pipes.

When the form and all the pipes are in position, concrete will be poured into the form 5, 7 and the concrete will flow into the interior of the pipes 2 to form a stable structure which will be able to withstand the forces of wind and wave action and will protect the shore from erosion. In addition, the pilings or pipes 2 will give the sand a place to accumulate.

Also, it should be noted that while not shown in the drawings, conventional reinforcing bars can be added to the pipes 2 and between the sides 5 to reinforce the concrete.

After the concrete has been allowed to set, the frames and form can be disassembled and moved to a new site, where the process will be repeated as many times as necessary.

Although the Plastic Permeable Groyne System and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. An assembly for making a concrete groyne comprising:

a frame having vertical members and horizontal members, said frame being formed in two halves which are secured together, a concrete form attached to an upper portion of said frame, said concrete form having a floor and at least two vertical sides, said floor having apertures formed therein, and a pipe holding assembly secured to a lower portion of said frame, said pipe holding assembly having apertures formed therein, said apertures in said pipe holding assembly and said apertures in said floor being vertically aligned, wherein pipes are positioned in said apertures in said floor and in said apertures in said pipe holding assembly.

2. The assembly for making a concrete groyne as claimed in claim 1, wherein said floor is made in two halves.

3. The assembly for making a concrete groyne as claimed in claim 1, wherein said pipe holding assembly is made in two halves.

4. The assembly for making a concrete groyne as claimed in claim 1, wherein said sides are hinged to said floor.

5. The assembly for making a concrete groyne as claimed in claim 1, wherein concrete is placed between said sides and said floor, and said concrete is also placed inside said pipes.

6. A concrete groyne made by the assembly as claimed in claim 1.

* * * * *